Sept. 19, 1933.   M. MENNESSON   1,927,750
MEASURING INSTRUMENT CONTROLS FOR MACHINES
Filed Sept. 30, 1932   2 Sheets-Sheet 1
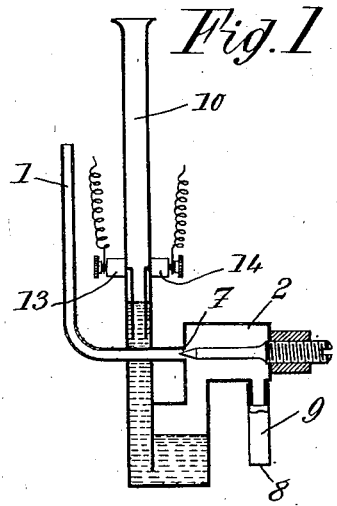
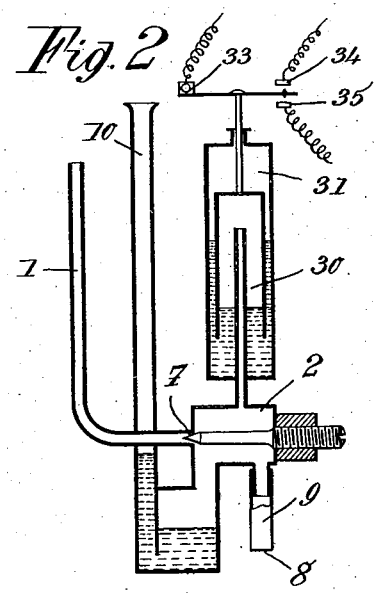
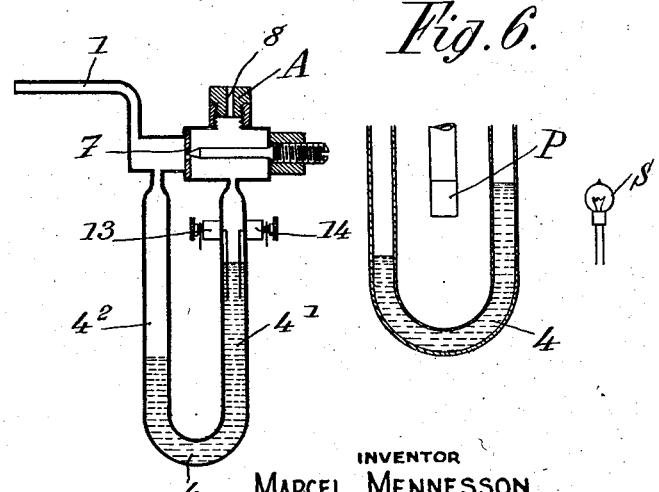
INVENTOR
MARCEL MENNESSON

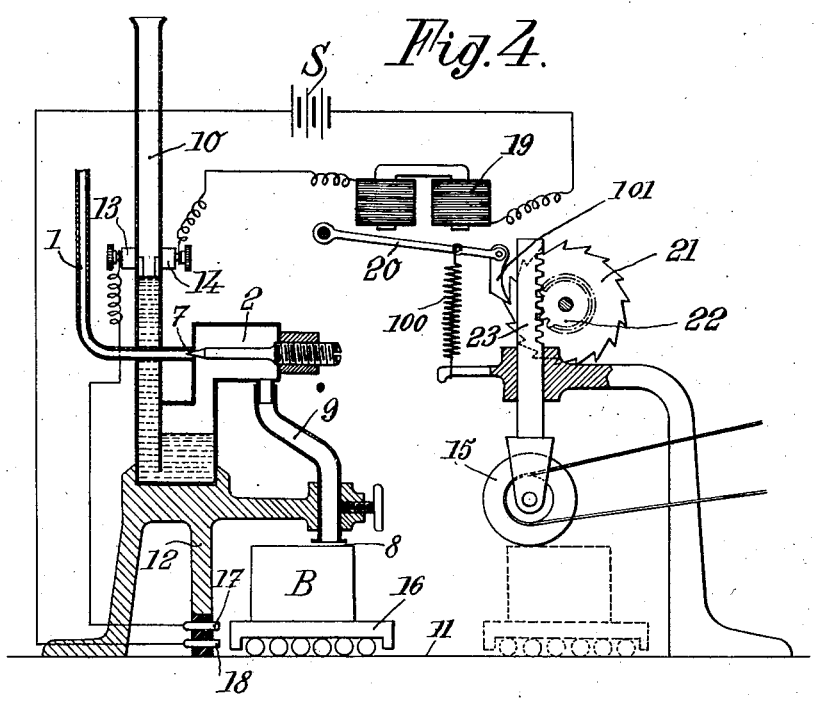
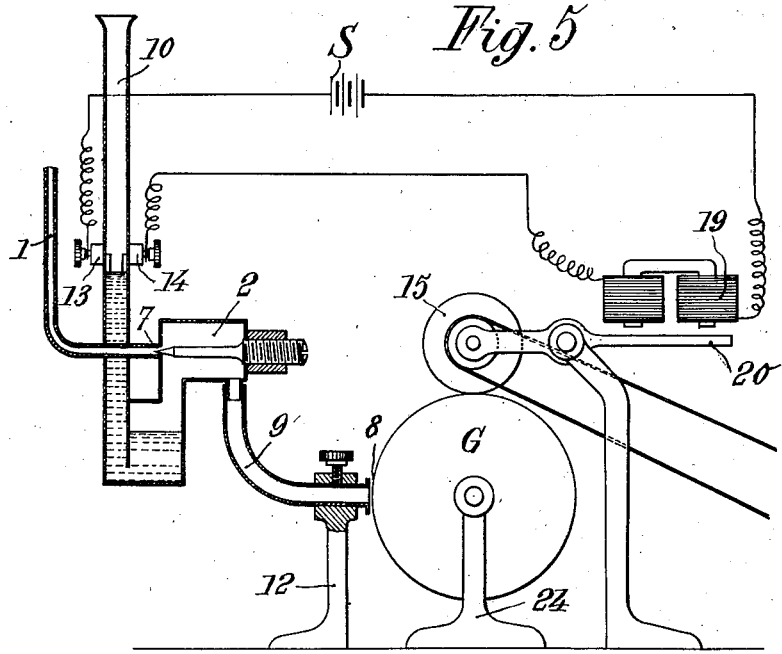

Patented Sept. 19, 1933

1,927,750

UNITED STATES PATENT OFFICE 1,927,750

MEASURING INSTRUMENT CONTROLS FOR MACHINES

Marcel Mennesson, Neuilly-sur-Seine, France, assignor to "Société Anonyme de Construction de Matériel Automobile, S. A. C. M. A.", Paris, France Application September 30, 1932, Serial No. 635,700, and in Belgium May 21, 1929

15 Claims. (Cl. 51—165)

The present invention relates to measuring instrument controls for machines and is a continuation in part of the inventor's copending application, Serial No. 442,915, filed April 9, 1930.

One of the objects of the present invention is to provide machines with a fluid operated measuring instrument capable of actuating a signal as soon as a piece of work being operated on by the machine reaches predetermined dimensions.

Another object is to provide a measuring instrument capable of starting or stopping a machine as soon as a piece of work being operated on by the latter has reached a predetermined size.

Further objects will appear in the course of the detailed description now to be given with reference to the accompanying drawings, in which:

Fig. 1 shows, diagrammatically, one embodiment of the invention wherein a manometer controls an electric circuit connected to either signalling, or machine control, means.

Figs. 2 and 3 illustrate two other possible modifications of the structure shown in Fig. 1.

Fig. 4 is a sectional diagrammatic view showing a manometric control for a planer or similar reciprocating machine.

Fig. 5 shows, in section, another form of grinding machine control operated by a measuring instrument applied to rotating work mounted in a lathe or similar device.

Fig. 6 represents, diagrammatically, a manometric control functioning in combination with a photo-electric cell.

Referring to Fig. 1 of the drawings, there is shown a conduit 1 supplied with air or other fluid under constant pressure from a regulating device such as is described in the inventor's copending application, Serial No. 334,987, filed January 25, 1929, said conduit discharging through an appropriate orifice into a pressure chamber 2. A needle valve 7 controls the effective section of the orifice just mentioned. A tube 9 terminating in a discharge orifice or nozzle 8 is adapted to be applied to a piece of work (see Figs. 4 and 5). A manometer 10 has one branch in communication with chamber 2, its other branch being provided with a pair of electrodes 13 and 14. Appropriate conductors are connected to electrodes 13, 14 and operate either a sound or light signalling system (not shown) or one of the machine control circuits to be described in connection with Figs. 4 and 5.

The above described assembly operation in the following manner: The position of needle valve 7 and the dimensions of the discharge orifice 8 are chosen so that when a piece of work having greater than certain predetermined dimensions is placed at a predetermined distance from discharge orifice 8, the fluid under pressure in chamber 2 will cause the liquid to rise in manometer 10 so as to close the circuit between electrodes 13 and 14. As the work positioned in front of orifice 8 diminishes in size during machining or grinding thereof, the distance between the orifice and the surface of the work increases, causing the pressure in chamber 2 to decrease and lowering the level of liquid in the left hand branch of manometer 10. When the liquid level in the latter becomes sufficiently low to open the circuit between electrodes 13 and 14, a lamp or a solenoid connected in circuit with said electrodes will be de-energized and either produce a signal for the workmen to stop the machine or will stop the machine itself.

In the modification shown in Fig. 2, the general assembly remains the same except that electrodes 13 and 14 are replaced by a structure designed to operate a switch. Here, pressure chamber 2 is provided with a vertical tube 32 communicating at its upper extremity with a bell 30 mounted inside of chamber 31 containing water or some liquid. Bell 30 operates a switch connected at one extremity to a fixed terminal 33, said switch oscillating at its other extremity between a pair of contacts 34 and 35 connected to appropriate mechanisms (not shown) for starting or stopping a machine, or for operating a pair of signals or signalling systems (not shown). The manner in which this form operates is evident from the description thereof.

In the form of construction shown in Fig. 3 a U-tube type of manometer 4 is mounted with one extremity communicating with conduit 1 and the other with pressure chamber 2. Changes in the diameter of a bore 28 formed in a plug A mounted in the wall of chamber 2 will vary the height of liquid in branches $4^1$ and $4^2$ of manometer 4 so as to open or close the circuit through electrodes 13 and 14 connected to a signalling or control system (not shown). Obviously, plug A may be replaced by some such tube as element 9 shown in Figs. 1 and 2 and conversely.

Fig. 4 shows the form of control represented in Fig. 1 applied to a grinding machine. Electrodes 13, 14 are here supplied with current from a suitable source S and are connected in circuit with a solenoid 19. The latter acts on an armature 20 against the action of a spring 100 to actuate a dog 101 which engages a sprocket wheel 21. The rotation of the sprocket wheel is communicated by a pinion 22 to a vertical rack 23 controlling the position of a grinding wheel 15 driven in any suitable manner. The work B is mounted on a carriage 16 which may be a planer or milling machine table and reciprocates from the dotted line position under the grinding wheel to the full line position under the discharge orifice 8. At each reciprocation, table 16 contacts with a pair of insulated contacts 17 and 18 mounted on a support 12 so as to close the circuit through elements S, 13, 14 and 19 and disengage dog 101 from sprocket wheel 21. The circuit is broken again as soon as table 16 starts back toward the dotted line position. The armature 20 is released and under the action of spring 100 the dog 101 produces the rotation of sprocket wheel 21 by the length of one tooth thus causing the grinding wheel to descend very slightly. This reciprocation is repeated until the work has been reduced to the desired size. As the dimensions of object B diminish, the pressure in chamber 2 also diminishes until finally the liquid in column 10 drops sufficiently to permanently break the circuit through elements 13 and 14. Grinding wheel 15 will then stop descending. It will thus be seen that the measuring instrument operates automatically to interrupt the advancement of the grinding wheel as soon as the work reaches a predetermined size. Obviously, the measuring instrument shown may be replaced by either one of the types shown in Figs. 2 and 3.

In the modification shown in Fig. 5, object B is replaced by a cylindrical object G mounted in an appropriately driven lathe 24 (driving mechanism not shown). Nozzle 8 is located adjacent the periphery of the work. Here variations in the diameter of object G vary the pressure in chamber 2 so as to make or break the circuit through solenoid 19 whose armature 20 is in the form of a lever acting on grinding wheel 15. From the drawing it will at once be evident that, when the pressure in chamber 2 drops sufficiently to break the circuit through electrodes 13, 14 and solenoid 19, armature 20 will release the pressure of grinding wheel 15 and the latter will cease to act on object G.

A signal such as an incandescent lamp may be included in the circuit. This lamp will be extinguished when the circuit is broken and will thus indicate that the work has reached the desired size.

Obviously the form of measuring instrument shown in Fig. 5 may be replaced by either of those represented in Figs. 2 and 3.

The invention is not to be taken as limited to manometers fitted with electrodes but includes any equivalent structure responsive to changes in level of the manometric liquid. Thus, a source of light S and a photo-electric cell P may be positioned in line with one another on opposite sides of an manometric column as shown in Fig. 6 so that the liquid in the latter interrupts (or deviates) the light coming from said source and falling upon the photo-electric cell, the latter acting to vary or interrupt the current flowing in the circuit controlling the grinding or cutting tool.

The term "cutting tool" as used in the claims is intended to indicate any tool capable of removing material from a work piece.

On the other hand, the liquid manometer completing the responsive measuring instrument is only indicated by way of example. In the copending application Serial No. 334,987, filed January 25, 1929, there is provided that any measuring apparatus responsive to variations of pressure may be substituted therefor. Without departing from the limits of the present invention, there may be provided different means for controlling working machines comprising any kind of apparatus responsive to variations of pressure in the measuring apparatus and acting by means of electric currents, or directly by means of a pneumatic or mechanic control, or otherwise.

What I claim is:—

1. In combination, a tool for doing work on a a work piece, a pneumatically operated measuring instrument associated with said tool for measuring changes produced by the tool in the work piece, and means operated by said measuring instrument to control the movement of said tool.

2. In combination, a fluid pressure chamber, a device to be controlled, an electric circuit controlling said device and associated therewith, and means responsive to variations in the pressure in said chamber to control said electric circuit.

3. In combination, a measuring instrument including a fluid pressure chamber the pressure in which varies in accordance with variations in physical conditions, a device capable of changing said physical conditions, an electric circuit controlling said device and associated therewith, and means responsive to variations in pressure in said chamber to control said electric circuit.

4. In combination, a measuring instrument including a fluid pressure chamber the pressure of which varies in accordance with variations in physical conditions, a device to be controlled, an electric circuit controlling said device and associated therewith, means connected to said pressure chamber to indicate the pressure therein, and means operated by said indicating means to control said electric circuit.

5. In combination, a pneumatically operated measuring instrument controlled by an object upon which work is to be done, a device for working on the object, an electric circuit controlling said device and associated therewith, and means controlled by said instrument to control said electric circuit.

6. In combination, a tool for doing work upon a work piece, a measuring instrument associated with said tool for measuring changes produced by the tool in the work piece, said instrument including a pressure chamber the pressure in which varies in accordance with variations in the dimensions of the work piece, and means responsive to such variations in pressure to control the movement of said tool.

7. In combination, a tool for doing work upon a work piece, a measuring instrument associated with said tool for measuring changes produced by the tool in the work piece, said instrument including a pressure chamber, a nozzle adapted to be positioned adjacent the surface of the work piece and connected to said pressure chamber, means to supply fluid under pressure to said chamber, an electric circuit controlling the movement of said tool and associated therewith, and means connected to said chamber and responsive to variations in the pressure therein caused by variations in the dimensions of the work piece to control said electric circuit.

8. In combination, a tool for doing work upon a work piece, a measuring instrument associated with said tool for measuring changes produced by the tool in the work piece, said instrument including a pressure chamber, a nozzle adapted to be positioned adjacent the surface of the work piece and connected to said pressure chamber, means to supply fluid under pressure to said chamber, an electric circuit controlling the movement of said tool and associated therewith, and means connected to said chamber and responsive to variations in the pressure therein caused by variations in the dimensions of the work piece to control said electric circuit, said last means including a manometer having a liquid therein and a pair of electrodes within said manometer connected in said circuit.

9. In a device of the class described, a tube, a pair of electrodes in said tube, a liquid in said tube, a chamber connected to said tube, means to supply fluid under pressure to said chamber, and means controlled by the dimensions of an object to be measured to vary the pressure in said chamber, whereby the level of the liquid in said tube is varied to make or break an electric circuit through said electrodes.

10. A machine for removing material from a work piece comprising two parts including a tool and a work support, means for automatically feeding one of said parts, a measuring device including a supply of fluid under pressure, a nozzle adapted to be positioned adjacent the work connected to said source, a gauging element associated with said nozzle and responsive to variations in the flow of fluid therefrom, means to render said feeding means inoperative, an electric circuit controlling said last named means, and means operated by said gauging element to control said electric circuit.

11. A machine for removing material from a work piece comprising two parts including a tool and a work support, means for automatically feeding one of said parts, a measuring device including a supply of fluid under pressure, a nozzle adapted to be positioned adjacent the work connected to said source, a gauging element associated with said nozzle and responsive to variations in the flow of fluid therefrom, means to render said feeding means inoperative, an electric circuit controlling said last means, and means operated by said gauging element to control said electric circuit, said feeding means including a solenoid.

12. In a metal working machine having a cutting tool and means to feed the tool towards the work piece, a measuring device associated with said machine comprising a supply of fluid under pressure, means to direct the fluid under pressure against a work piece in the machine, the pressure of the fluid varying with the space between the directing means and the work piece, an electric circuit controlling said feeding means, means to indicate the pressure of the fluid, and means controlled by said indicating means to control said electric circuit.

13. In a metal working machine having a cutting tool and means to feed the tool towards the work piece, a measuring device associated with said machine comprising a supply of fluid under pressure, means to direct the fluid under pressure against a work piece in the machine, the pressure of the fluid varying with the space between the directing means and the work piece, an electric circuit controlling said feeding means, means to indicate the pressure of the fluid, and means controlled by said indicating means to control said electric circuit, said feeding means including a solenoid.

14. In a metal working machine having a cutting tool and means to feed the tool towards the work piece, a measuring device associated with said machine comprising a supply of fluid under pressure, means to direct the fluid under pressure against a work piece in the machine, the pressure of the fluid varying with the space between the directing means and the work piece, an electric circuit controlling said feeding means, means to indicate the pressure of the fluid, and means controlled by said indicating means to control said electric circuit, said feeding means including a solenoid, and said directing means including a nozzle adapted to be positioned adjacent the work piece.

15. In a metal working machine, a cutting tool, means to urge said cutting tool toward a work piece, means associated with said machine to direct a jet of fluid under pressure against the work piece, said pressure varying as material is removed from the work piece, means to indicate such variation in pressure, and means controlled by said indicating means to render said urging means inoperative.

MARCEL MENNESSON.